United States Patent
Jansche et al.

(10) Patent No.: US 9,747,895 B1
(45) Date of Patent: Aug. 29, 2017

(54) BUILDING LANGUAGE MODELS FOR A USER IN A SOCIAL NETWORK FROM LINGUISTIC INFORMATION

(71) Applicant: Google Inc., Mountain View, CA (US)

(72) Inventors: Martin Jansche, Mountain View, CA (US); Mark Edward Epstein, Mountain View, CA (US)

(73) Assignee: Google Inc., Mountain View, CA (US)

( * ) Notice: Subject to any disclaimer, the term of this patent is extended or adjusted under 35 U.S.C. 154(b) by 549 days.

(21) Appl. No.: 13/936,858

(22) Filed: Jul. 8, 2013

Related U.S. Application Data

(60) Provisional application No. 61/669,854, filed on Jul. 10, 2012.

(51) Int. Cl.
*G10L 15/183* (2013.01)
*G10L 15/26* (2006.01)
*G10L 15/18* (2013.01)
*G06F 17/21* (2006.01)

(52) U.S. Cl.
CPC ............. *G10L 15/18* (2013.01); *G06F 17/21* (2013.01)

(58) Field of Classification Search
CPC ............. G10L 15/06; G10L 2015/0635; G10L 15/065; G10L 15/083; G10L 15/183; G10L 15/26
USPC .................... 704/250, 255, 207.1, 270.1, 235
See application file for complete search history.

(56) References Cited

U.S. PATENT DOCUMENTS

| | | | |
|---|---|---|---|
| 6,442,519 B1 * | 8/2002 | Kanevsky | G10L 15/07 704/243 |
| 6,484,136 B1 * | 11/2002 | Kanevsky | G06F 17/2765 704/255 |
| 6,901,364 B2 * | 5/2005 | Nguyen | G10L 15/30 704/235 |
| 8,170,866 B2 * | 5/2012 | Gilbert | G10L 15/065 704/255 |
| 8,532,994 B2 | 9/2013 | Malegaonkar et al. | |
| 8,630,627 B2 * | 1/2014 | Davitz | G06F 17/30979 379/88.11 |
| 8,782,080 B2 * | 7/2014 | Lee | G06F 17/30979 707/771 |
| 9,009,025 B1 * | 4/2015 | Porter | G10L 15/063 704/246 |
| 9,223,898 B2 * | 12/2015 | Li | G06F 17/30958 |
| 9,460,716 B1 * | 10/2016 | Epstein | G10L 15/063 |
| 9,529,898 B2 * | 12/2016 | Epstein | G06F 17/30707 |

(Continued)

*Primary Examiner* — Martin Lerner
(74) *Attorney, Agent, or Firm* — Fish & Richardson P.C.

(57) ABSTRACT

Methods, systems, and apparatus, including computer programs encoded on computer storage media, for building language models. One of the methods includes identifying a first group of one or more users associated with a user in a social network. The method includes identifying first linguistic information associated with the first group. The method includes generating a first language model based on the first linguistic information. The method includes identifying a second group of one or more users associated with the user. The method includes identifying second linguistic information associated with the second group. The method includes generating a second language model based on the second linguistic information. The method includes associating the first language model and the second language model with the user.

21 Claims, 7 Drawing Sheets

(56) References Cited

U.S. PATENT DOCUMENTS

| | | | | |
|---|---|---|---|---|
| 2005/0228667 | A1* | 10/2005 | Duan | G10L 15/197 704/256 |
| 2007/0219779 | A1* | 9/2007 | Kojima | G10L 15/197 704/9 |
| 2009/0112600 | A1* | 4/2009 | Gilbert | G10L 15/193 704/270.1 |
| 2010/0049770 | A1* | 2/2010 | Ismalon | G06F 17/30646 707/765 |
| 2011/0077941 | A1* | 3/2011 | Dey | H04M 7/0024 704/235 |
| 2011/0153324 | A1 | 6/2011 | Ballinger et al. | |
| 2011/0161081 | A1 | 6/2011 | Ballinger et al. | |
| 2011/0246184 | A1* | 10/2011 | Gilbert | G10L 15/193 704/9 |
| 2012/0059653 | A1* | 3/2012 | Adams | G10L 15/19 704/243 |
| 2013/0191416 | A1* | 7/2013 | Lee | G06F 17/30979 707/771 |
| 2013/0238332 | A1* | 9/2013 | Chen | G10L 15/183 704/240 |
| 2013/0346077 | A1* | 12/2013 | Mengibar | G10L 15/265 704/235 |
| 2014/0074470 | A1* | 3/2014 | Jansche | G10L 15/187 704/244 |
| 2014/0108018 | A1* | 4/2014 | Phillips | G10L 15/22 704/275 |
| 2015/0156145 | A1* | 6/2015 | Davitz | G06F 17/30979 709/206 |
| 2015/0332672 | A1* | 11/2015 | Akbacak | G10L 15/18 704/257 |
| 2015/0348541 | A1* | 12/2015 | Epstein | G10L 15/063 704/257 |
| 2016/0299882 | A1* | 10/2016 | Hegerty | G06F 17/3064 |

* cited by examiner

BUILDING LANGUAGE MODELS FOR A USER IN A SOCIAL NETWORK FROM LINGUISTIC INFORMATION

CROSS-REFERENCE TO RELATED APPLICATIONS

This application claims priority to U.S. Provisional Application Ser. No. 61/669,854, filed on Jul. 10, 2012, entitled "BUILDING LANGUAGE MODELS," the entire contents of which are hereby incorporated by reference.

BACKGROUND

Speech recognition refers to the process of converting spoken words to text. Speech recognition systems translate verbal utterances into a series of computer readable sounds which are compared to known words. For example, a microphone may accept an analog signal which is converted into a digital form that is divided into smaller segments. The digital segments can be compared to the smallest elements of a spoken language. From this comparison, the speech recognition system can identify words by analyzing the sequence of the identified sounds to determine, for example, corresponding textual information.

SUMMARY

This specification describes technologies relating to speech recognition.

In general, one innovative aspect of the subject matter described in this specification can be embodied in methods that include the actions of identifying a first group on one or more users associated with a user in a social network. The methods include the actions of identifying first linguistic information associated with the first group. The methods include the actions of generating a first language model based on the first linguistic information. The methods include the actions of identifying a second group on one or more users associated with the user in the social network. The methods include the actions of identifying second linguistic information associated with the second group. The methods include the actions of generating a second language model based on the second linguistic information. The methods also include the actions of associating the first language model and the second language model with the user.

In general, another innovative aspect of the subject matter described in this specification can be embodied in methods that include the actions of identifying a first group. The methods include the actions of identifying a frequently occurring topic on a social network site. The methods include the actions identifying linguistic information associated with the frequently occurring topic. The methods include the actions generating a language model based on the linguistic information.

In general, another innovative aspect of the subject matter described in this specification can be embodied in methods that include the actions of identifying a first group. The methods include the actions of identifying a user in first group. The methods include the actions of identifying linguistic information associated with the user and the first group. The methods include the actions of generating a language model based on the linguistic information. The methods also include the actions of forming a logical assignment between the language model and the user.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The first linguistic information may include text entered by the first user to the second user. The methods may include the actions of identifying a second user in the social circle and identifying second linguistic information associated with the second user. Generating the language model may be further based on the second linguistic information. Identifying the second user may include identifying a user in the social circle who shares a common characteristic with the first user. The methods may include the actions of receiving voice information from the user, determining a context for the voice information, selecting the first language model based on the context, and processing the voice information using the first language model. The methods may include the actions of providing the language model to a mobile device associated with the user. The methods may include the actions of receiving context specific linguistic information associated with the user and a specific context, generating a context specific language model, receiving voice information from the user in the specific context, and processing the voice information using the language model and the context specific language model. Processing the voice information may include applying a first weight to the language model and applying a second weight to the context specific language model. The methods may also include the actions of identifying that a context is associated with the frequently occurring topic, receiving voice information from a user in the context, and processing the voice information using the language model.

Particular embodiments of the subject matter described in this specification can be implemented so as to realize one or more of the following advantages. Language models can be customized for individual users. A partially customized language model can be obtained for a user who has not previously used the speech recognition system. Relationships and other types of information represented in a social graph can be leveraged to improve language models. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A speech recognition system uses an acoustic model and a language model to recognize speech. In general, an acoustic model includes digital representation of individual sounds that are combinable to produce a vast collection of words, phrases, etc. A language model assigns a probability that a sequence of words will occur together in a particular sentence or phrase.

In general, building a language model includes obtaining a vocabulary and training data. The training data is a corpus of data that reflects use of the language, for example, documents, transcripts, e-mail, academic papers, novels, etc. Because people speak differently in different contexts (for example, people use different language patterns when writing academic articles than when writing letters to family) the outputs produced by a language model can be improved if the language model is tailored to one or more contexts. The quality of the output of a language model can be improved if the language model is built from training data that has a similar context.

Figure 1:
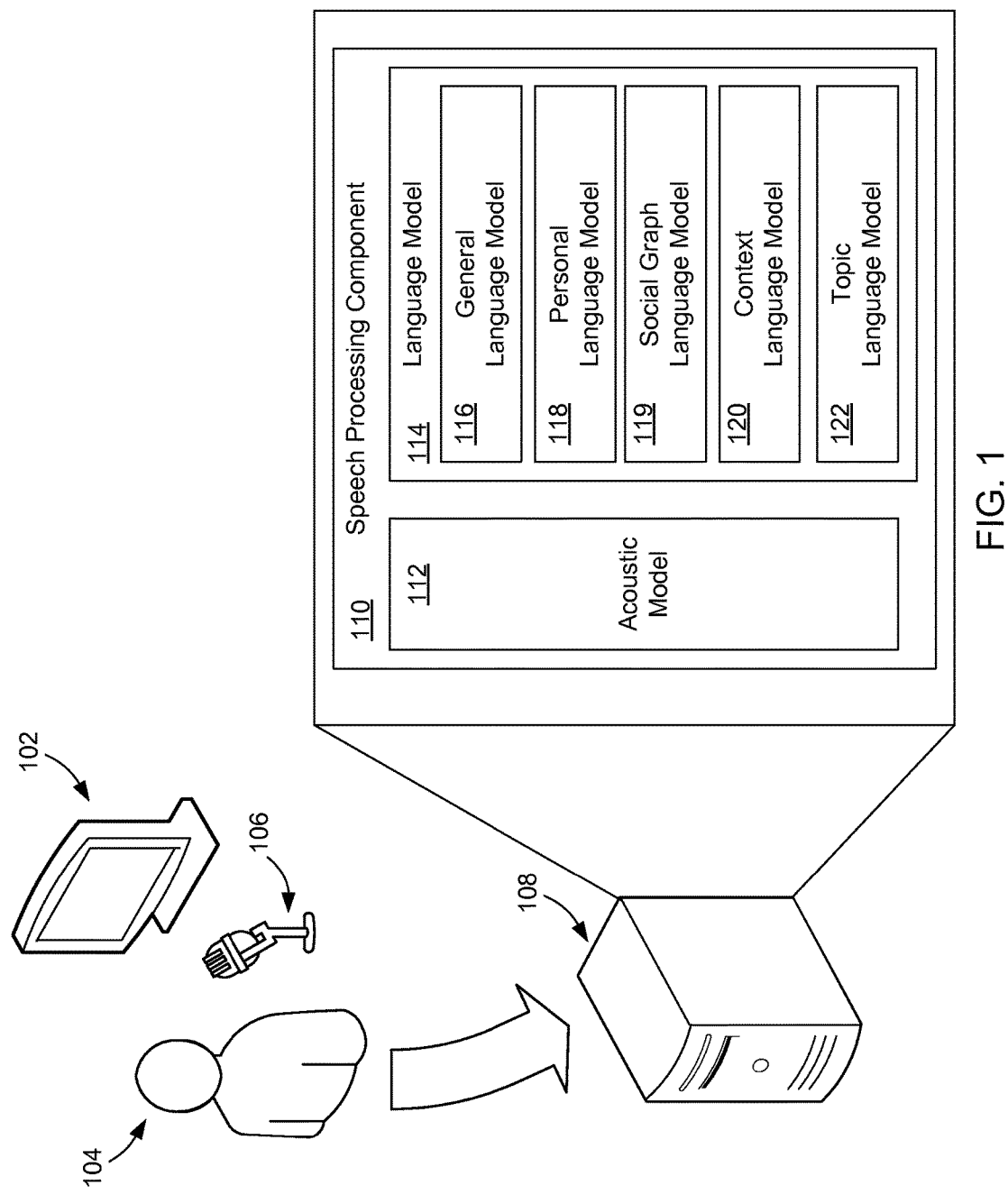
FIG. 1 illustrates an example system for recognizing speech.

FIG. 1 illustrates an example system for speech recognition. In this particular arrangement, a user 104 speaks into a microphone 106 of a computer system 102. The computer system 102 may be a standalone computer connected to a network or any computational device connected to a microphone, for example, a personal computer, a tablet computer, a smart phone, etc.

The user's speech is sent to a computer system 108 over a network (not shown), for example, the Internet. The computer system includes a speech processing component 110. The speech processing component 110 includes an acoustic model 112 and a language model 114.

The acoustic model 112 maps the sounds collected from the user 104 into component parts, called phones and can be considered as basic elements of speech. For example, the English language can be spoken using approximately 40 phones. The acoustic model 112 accepts sounds and maps them to corresponding phones. From the phones, the acoustic model 112 can determine one or more words that the user 104 may have spoken. However, conventional acoustic models have limited effectiveness because different individuals pronounce words and sounds slightly differently. For example, a middle aged man from New York sounds substantially different than a young girl from Oklahoma. The quality of the output of an acoustic model can be improved by selecting an acoustic model built from samples of speech from users with similar demographic characteristics.

Developing acoustic models often requires a relatively large set of data. The data includes samples of people speaking known words. The speech is broken into phones based on the phones known to make up the word. Factors that affect the performance of an acoustic model include the similarity between the characteristics of the individuals using the acoustic model and the ages of the individuals who provided samples which were used to create the acoustic model. These characteristics can include, for example, age and gender.

Even when using an appropriate acoustic model, the basic elements of speech can be identical or very similar. For example, an acoustic model alone cannot distinguish homonyms such as red and read. As another example, an acoustic model may have difficulty with words that are not homonyms but sound very similar, like Boston and Austin. In order to improve accuracy and select the correct word, the speech processing component 110 uses the language model 114.

The language model 114 contains a statistical representation of how often words co-occur. Words are said to co-occur if they are used in a sentence without any intervening words. For example, in the phrase "the quick brown fox jumped over the lazy dog" co-occurrences of two words include "the quick", "quick brown", "brown fox", "fox jumped", "jumped over", "over the", "the lazy", and "lazy dog". Co-occurrences of three words include "The quick brown", "quick brown fox", "brown fox jumped", "fox jumped over", "jumped over the", "over the lazy", "the lazy dog".

The language model 114 can be customized based on a specific context. Multiple language models can be combined using statistical methods to create the language model 114. For example, a language model may segment training data into two or three word parts. For any two words in the model, the model includes a probabilistic distribution as to the identity of the third word. For example, the language model presented with the words "Texas weather" can determine that the third word is likely "Austin" and not "Boston."

A language model can be combined (e.g., with one or more other language models) to build more inclusive language models. In this example, the basis of the language model 114 is the general language model 116. The general language model 116 is representative of how the language, for example English, is generally spoken.

The language model 114 may also include a personal language model 118, which may include a statistical representation of how the user 104 speaks across different contexts. A social graph language model 119 is a statistical representation of how the user 104 interacts with individuals connected to a social graph (e.g., are members of a social graph of the user 104, have one or more relationships represented in the social graph, etc.). Different social graph models 119 can be used for different social relationships. For example, the user 104 may have a "college buddies" social graph language model, a "family" social graph language model, a "colleagues" social graph language model, and/or a "spouse" social graph language model. The speech processing component 110 can develop these models based on interactions between the user and the members of the user's social graph (or graphs) on the social networking site.

The system may identify the relationships between the users based on input provided by the user 104 and the other users. For example, the user 104 may identify his or her spouse and the user may have a group of friends labeled "college buddies" or "co-workers". In some implementations, the speech processing component 110 can derive relationships based on user provided information (e.g., a user profile). For example, if two users work for the same employer and are members of each other's social graph, the system may determine and identify them as colleagues.

The social graph language model 119 may be selected based on to whom the user is communicating. For example, if the user is communicating with colleagues, then the speech processing component may use a "colleagues" social graph language model. If the user is communicating with relatives, the speech processing component may use a "family" social graph language model.

The context language model 120 is a statistical representation of how the user 104 speaks in a particular context. For example, a user 104 in a chat room with friends typically has a different word usage, grammar, and dialect than the same user would have in a chat room with relatives, teachers or another different group of individuals. In some implementations, the context language model can be developed by collecting the data from a chat room. The user 104 may use different language when posting on a blog or a discussion group depending on the intended audience.

A topic language model 122 is a statistical representation of how many users, which may or may not include the user 104, speak when discussing a particular topic. Users speaking about a particular topic may tend to use similar words and phrases (e.g., jargon). Users speaking in a chat room may have brief bursts of discussing one topic and then the subject of the conversation may drift to another topic. As the users change topics, the language they use may change accordingly.

In some implementations, signals from a social network site can be used to select the context and topic language models. For example, identifying whom the user 104 is communicating with may affect a selected social graph model 119. Speech recognition systems integrated into social graph applications can provide a source for the development of demographic specific acoustic models and individualized language models.

Figure 2:
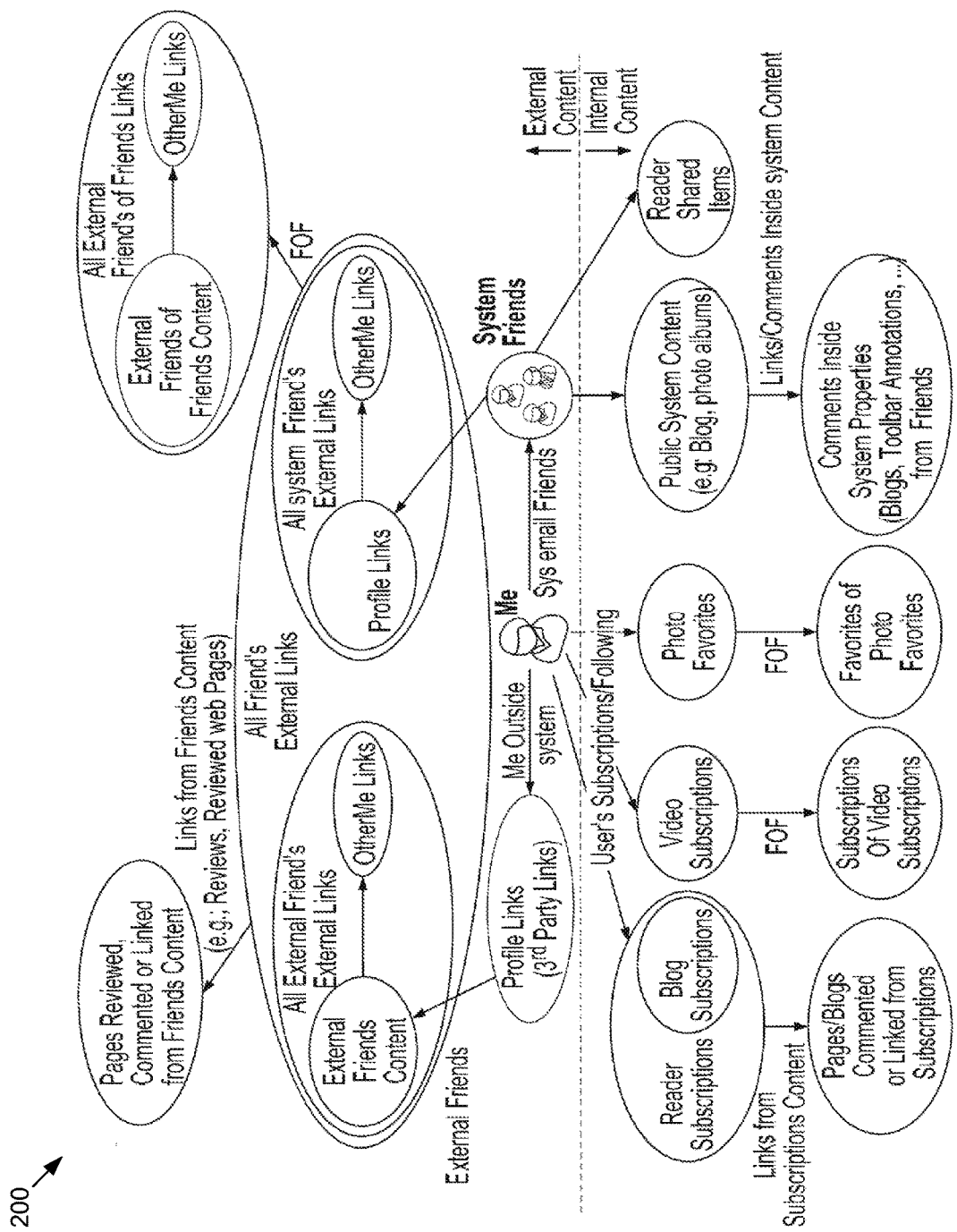
FIG. 2 is a diagram of example sources of social graph information.

FIG. 2 is a diagram 200 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 200 shows a user and the different connections possible to extend a user's social graph to people and content both within a system and across one or more external networks and shown at different degrees of separation. For example, a user can have a profile or contacts list that includes a set of identified friends, a set of links to external resources (e.g., web pages), and subscriptions to content of the system (e.g., a system that provides various content and applications including e-mail, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph are user set. Alternatively, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social graphing site) or type of interaction (e.g., endorsing or selecting items associated with friends). As interaction changes, the relationship of a particular contact in the social graph can also dynamically change. Thus, the social graph can be dynamic rather than static.

In some alternative implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

Figure 3:
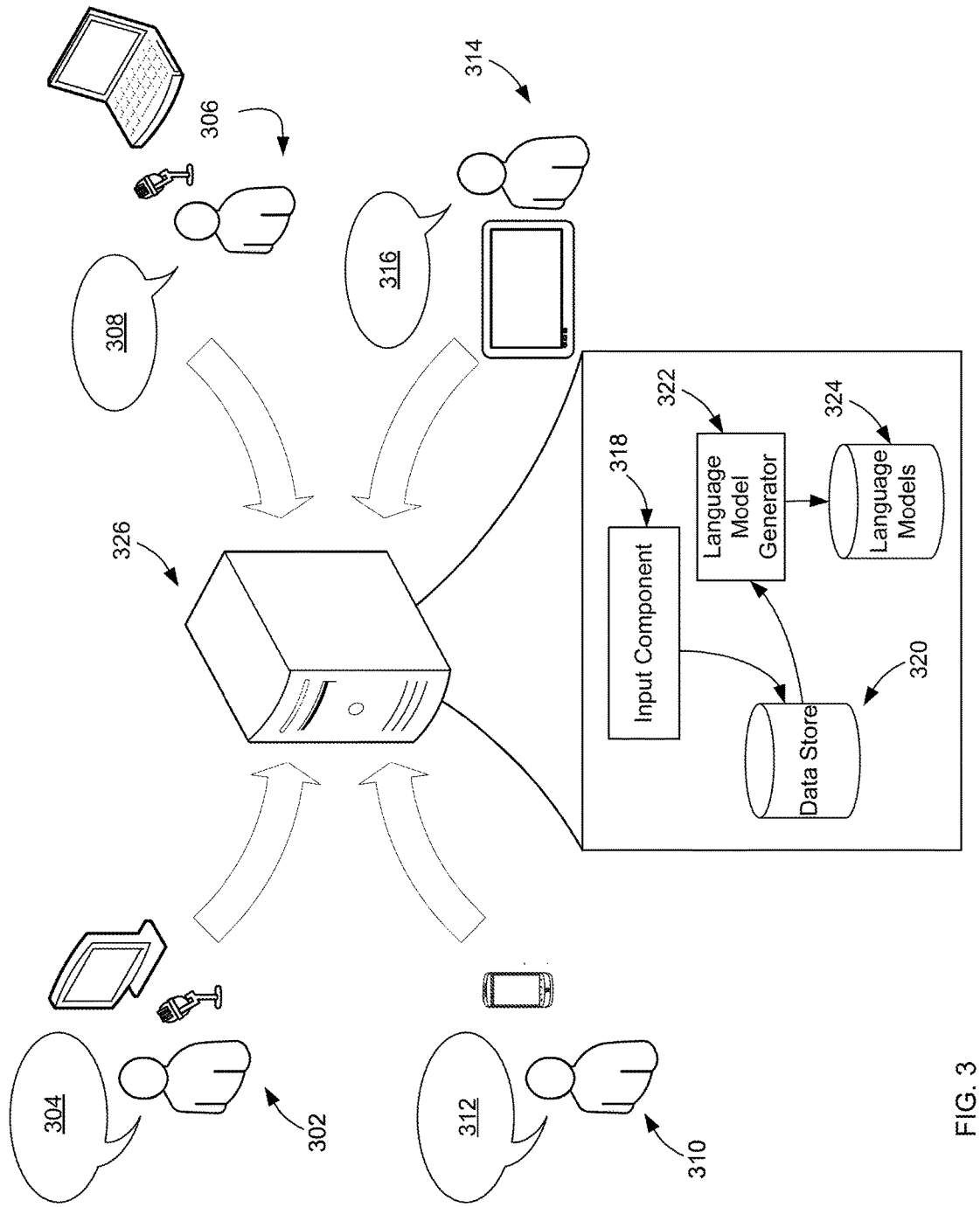
FIG. 3 illustrates an example of generating language models from interactions on a social networking site.

FIG. 3 illustrates an example of generating language models from interactions on a social networking site. Users 302, 306, 310, and 314 communicate over a server 316 hosting a social networking site. An input component 318 can process input from a user, for example, the user 302. In some scenarios, the input may be in the form of vocal utterances 304 provided over a microphone or as text entered onto a keyboard. The input component can relay the input from the user 302 to the other users 306, 310, and 314. Similarly vocal utterances 308, 312, 316 can be distributed to the other users.

To improve the quality of the language model that interprets the vocal utterances, the input component 318 can store a text version of the input in a data store 320.

Periodically, a language model generator 322 can generate a language model based on the data in the data store 320. The language model generator 322 can generate contextually aware language models, for example, the language model generator 322 may generate a language model that is specific to the user's interactions with members of his social graph. Similarly, the language model generator 322 can generate a language model that is particular to a chat room. The language model can later be used when the user is again interacting with members of that social graph, communicating in a chat room, etc.

In some implementations, the language model generator 322 identifies key pieces of information from the users' profiles in order to categorize the language model. For example, the language model generator 322 may note that the users 302, 306, 310, 314 have a relationship on a social graph (e.g. identified as "friends") and may note that all the users attended the same school at the same time. In some implementations, the language model is tagged based on the shared profile information.

Later, when one of the users is taking part in another chat with other users who share similar profile information and social graph relationships, the social networking site may use the language model to improve the tracked interactions of the users. For example, if a new user (not shown) enters into a chat room with the user 302 and the new user shares a demographic characteristic and social graph relationship (for example, has a friend relationship and attended the same school), then a speech recognition system may use the previously generated language model.

In some implementations, the language model may also be used in other contexts, for example, if the user 302 is composing an e-mail to the user 306, the speech recognition system may use the generated language model. In some implementations, the social graph relationship between the user and the target does not need to be direct so long as a relationship exists and the users share the same profile information. For example, posts between the user 306 and the user 314 may be used in the language model for user 302 even if user 314 does not have a direct social relationship with the user 302 provided the user 302 has a social relationship with the user 306, the user 306 has a social relationship with the user 314, and all three users (user 302, 306, and 314) share a common element of profile data (for example, they all attended the same school at the same time).

Figure 4:
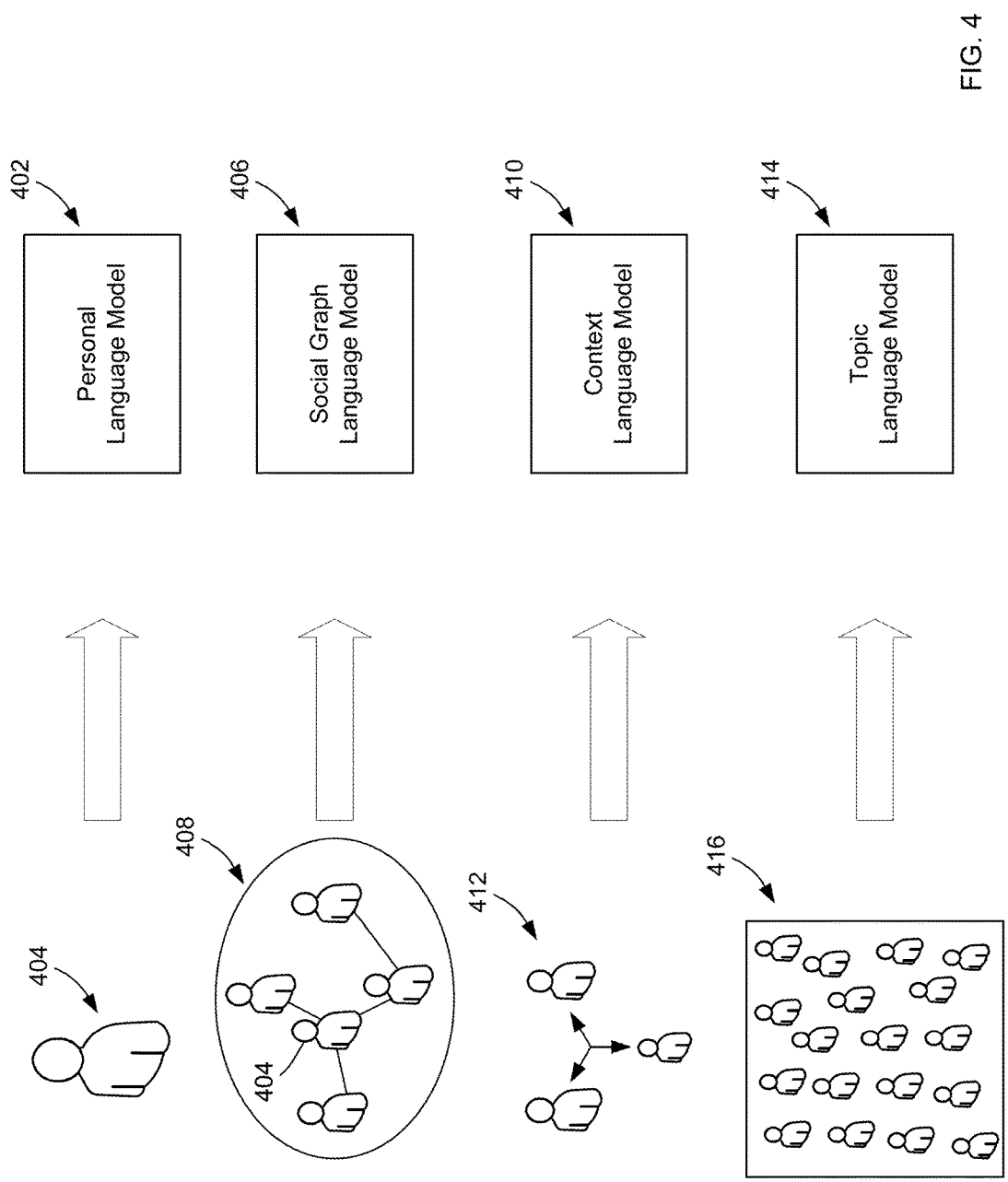
FIG. 4 illustrates different types of language models.

FIG. 4 illustrates different types of language models. A personal language model 402 is generated based on the input supplied exclusively by the user 404. The input may include, for example, text entered into a chat, posts to a blog, posts to a micro-blog, messages, or any other input types supplied by the user 404 to a social network site.

A social graph language model 406 can be developed from members of a user's 404 social graph. For example, input supplied by the user 404 when communicating with members of the social graph 408 may be combined with input supplied by members of the social graph 408 when communicating with each other. In some implementations, the social graph 408 may be subdivided based on different criteria. For example, a language model may be generated based on communications between users who have a common relationship (for example, friends, colleagues, etc.), or based on communications between users who share common user profile information (for example, school, employer, home town, profession, member of the same social club, common interests, etc.)

A context language model 410 can be developed from localized user interactions in a particular context. For example, input that users provide in a chat room 412 or input provided by users posting on a blog or micro-blog can be used to create a language model that is particular to that chat room, blog, or micro-blog.

A topic language model 414 can be developed from input provided by related or unrelated users 416 discussing a particular topic. For example, users on a social networking site discussing music by a particular musician are likely to use similar language. Similarly, users discussing a particular movie, technology, or other topic are likely to use similar language.

In a chat room, blog, or micro-blog, topics tend to change over time. In order to have a successful language model, a language model generator detects shifts in the conversations. For example, the language model generator may use conventional clustering algorithms to determine if one post is semantically related to the previous post or posts. Once the difference exceeds a threshold, the language model generator determines that a new topic has started.

In scenarios where the user has not previously used the speech recognition system, the system can obtain a language model based on information that the user 104 has included in his user profile and social graph. For example, the speech processing component may adopt a "college friends" social graph model from a member of the user's social graph who attended college with the user. The speech processing component may adopt a "professional" social graph language model from an individual tagged as a colleague. In some implementations, the speech processing component may combine multiple language models to create a particular social graph language model. For example, the speech processing component may combine the individual "college buddies" language models from each of the users in the user's social graph who attended college with the user.

Figure 5:
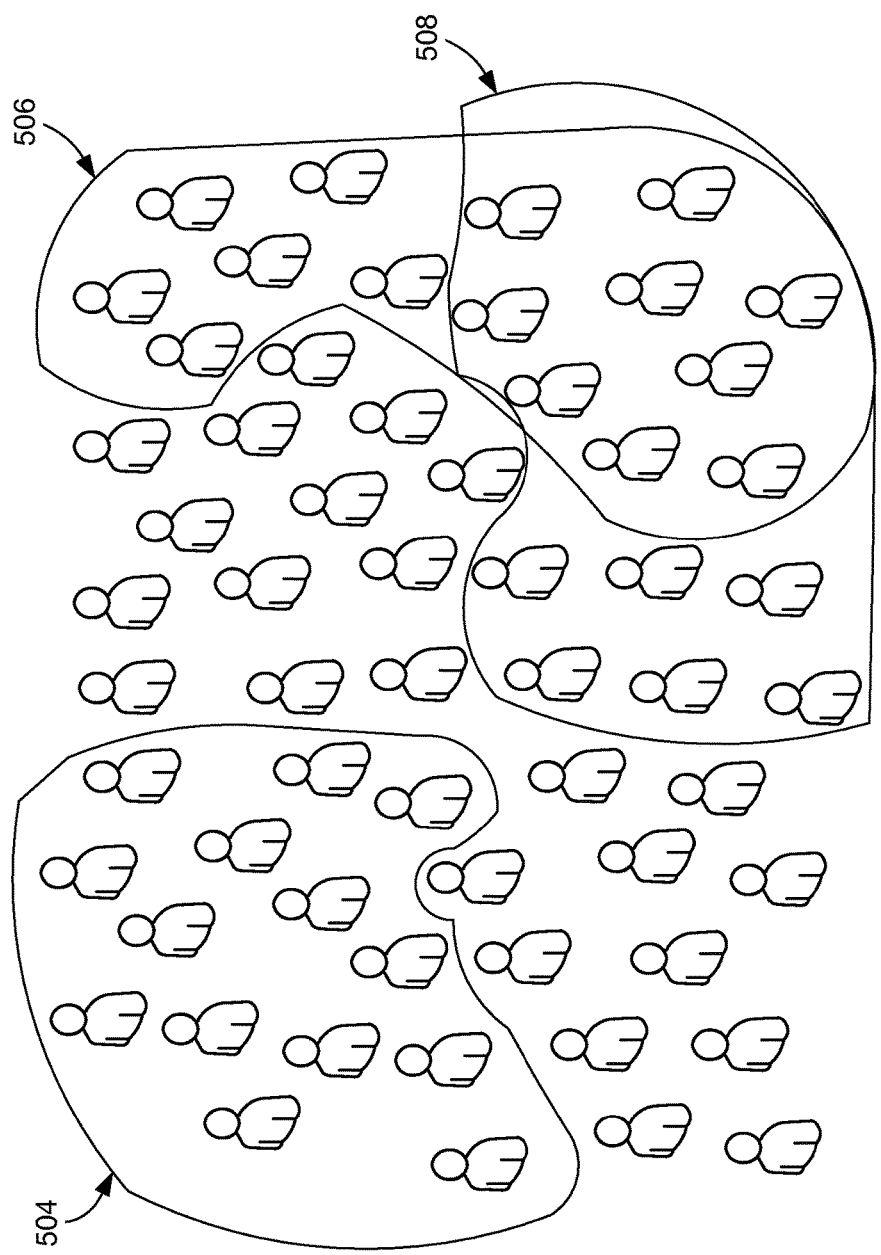
FIG. 5 illustrates clustering users.

FIG. 5 graphically illustrates clustering users. Users on a social networking site frequently provide profile information which describes information about the user. This information can include gender, birthdate, birthplace, current city, education, and employment.

As an individual user associated with a user profile uses a speech recognition capability on a device, for example, a computer, tablet, or smartphone, the acoustic information can be mapped to phones and can be stored in a data store. In some implementations, the data store uses the acoustic information to determine the length of a phonetic phone in a particular word, the energy with which the phonetic phone is pronounced, and the frequency with which the phonetic phone is stated.

Once sufficient data is collected, the users may be segmented based on information included in the user's profiles. For example, group 504 is a group of users, each user's profile indicates that the user was born in the Southern United States. Group 506 is a group of users whose user profile indicates that the users who were born in the Northern United States. Group 508 is a group of users who's user profile indicates that they currently live in the Northern United States.

Acoustic data from each group may be used to create an acoustic model specific to that demographic. Examples of user profile data that may be used to segment users and create acoustic models include gender, birth place, current residence, and age.

Gender divides users into male and female users. Birthplace and current residence may be determined based on state, province, or similar geopolitical entity, for example, Ohio or Ontario. Birthplace and current residence may also be determined based on a larger region, for example, Northern United States, Southern United States, or Western United States. Age may divide users into categories such as elderly, middle aged, adult, young, and child. In some implementations, acoustic models can be developed based on a combination of user profile traits. For example, the system may develop an acoustic model for adult women who were born in the Southern United States and currently live in the Western United States.

In some implementations, users can be grouped based on social graph information. For example, a user may be grouped based on their relationships in the social graph, which chat rooms they participate in, and the topics that are of interest to them, based on posts to blogs and micro-blogs. In this implementation, once an acoustic model is developed for the members of the group, the acoustic model can be used for each member of the group.

In some implementations, topics of interest can be used to infer demographic characteristics of users. For example, adults are more likely than children to discuss politics, young adults are more likely than elderly users to discuss pop music, etc.

In some implementations, clustering algorithms can be used using user profile traits and relationships in a social graph as features that are used to determine the cluster. Clustering can be a hard clustering model, where each user is associated with a cluster. Clustering can also be soft clustering model, where each user is associated with a probability of belonging to the cluster.

Figure 6:
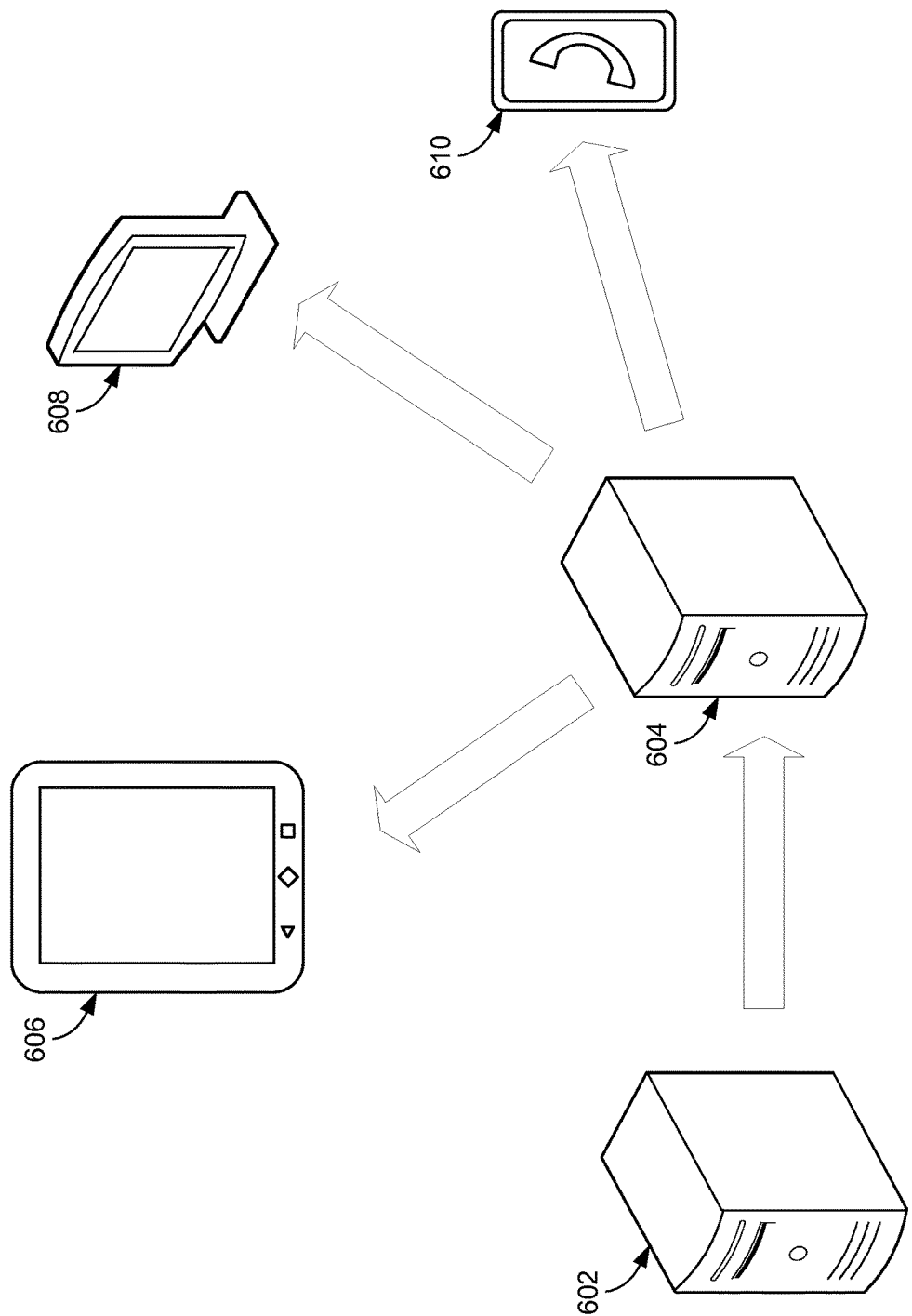
FIG. 6 illustrates the distribution of language models across multiple platforms.

FIG. 6 illustrates the distribution of language models across multiple platforms. Once a language model for a user has been created on the social network site 602, the language model can be distributed for use on other devices of the user. In some implementations, the language model from the social network site 602 can be provided to a distribution server 604. The distribution server 604 can distribute the language model to other user devices. For example, the language model can be distributed to a tablet 606, a personal computer 608, and a smart phone 610.

In some implementations, the language model can be distributed to a user device in response to a request from the user device, or the language model can be distributed to the user device in response to a signal from the distribution server 604.

In some implementations, the distribution may be transparent to the user. For example, the smart phone 610 may connect to the distribution server 604 periodically and update the language model on the device. In some implementations, the distribution server 604 notifies the user devices when a new language model is available. The distribution server can also provide an indicator of the most recent language model in response to a request from a user device. For example, the distribution server may receive a request from a user device requesting the version of the most recent model. The distribution server may then provide an indicator, such as a time stamp, to the user device.

Other communication systems can also be used, for example, the user device may request an updated language model and provide an indicator of the currently used language model. For example, the user device may provide a time stamp associated with the currently used language model. The distribution server 604 may compare the provided indicator to the indicator of the current language model for the user to determine if an update is required.

Figure 7:
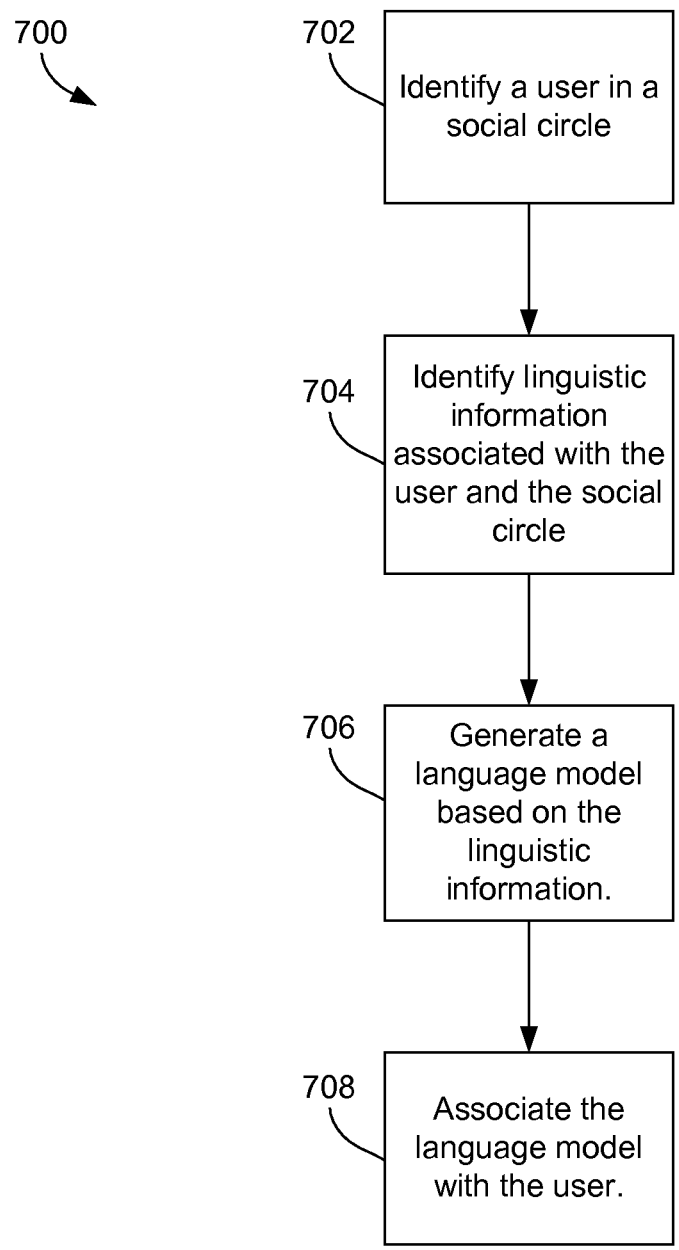
FIG. 7 is a flow chart of an example process for building language models.

FIG. 7 is a flow chart of an example process for building language models. The process can be performed, for example, by the speech processing component 110 of FIG. 1. For simplicity, the process will be described in terms of a system performing the process.

The process 700 identifies 702 a user in a social circle. The user is the user for whom the language model will be generated. The user can be a member of a social graph with connections to one or more other users.

The process 700 identifies 704 linguistic information associated with the user and the social circle. The linguistic information can be information that the user supplied while communicating with members of the social circle, for example, posts to a chat room or hang out. In some implementations, the linguistic information can include linguistic information provided by other users connected to the user in the social graph.

The process 700 generates 706 a language model based on the linguistic information. The language model can be generated using, at least in part, the linguistic information as a source of the data. As described above, the language model is a statistical representation of the co-occurrence of words in the linguistic information.

The process 700 associates 708 the language model with the user. The language model may be associated with the user for use on the social network site or other application. In some implementations, the language model may be distributed to one or more user devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
receiving voice data associated with an utterance of a particular user of a social network, the social network comprising multiple groups of users, the users segmented into the groups based on data indicating respective commonalities for the users in each group;
identifying multiple language models associated with the social network, each of the multiple language models respectively associated with one or more of the groups of users of the social network,
wherein the multiple language models comprise a first language model that was generated based on first linguistic information associated with a first group of the multiple groups of users of the social network, and a second language model that was generated based on second linguistic information associated with a second group of the multiple groups of users of the social network, wherein each of the first group and the second group is part of a social graph for the particular user, the social graph for the particular user determined by a set predetermined number of degrees of separation from the particular user to other users in the social network, and wherein the particular user is associated with a particular cluster based, at least in part, on a probability of the user belonging to the cluster;
selecting at least the first language model from among the multiple language models associated with the social network based on a first criteria of a set of selection criteria and the second language model from among the multiple language models associated with the social network based on a second criteria of the set of selection criteria, the second criteria being different from the first criteria, wherein the set of selection criteria comprises a social relationship between the particular user of the social network and another user of the social network with whom the particular user is communicating, a topic of communication associated with the utterance of the particular user of the social network, a context within which the voice data associated with the utterance of the particular user of the social network is received, and a demographic characteristic of the particular user of the social network;
aggregating at least the first language model selected from among the multiple language models associated with the social network based on the first criteria of the set of selection criteria and the second language model selected from among the multiple language models associated with the social network based on a second criteria of the set of selection criteria to form an aggregated language model; and generating a transcription of the utterance of the particular user using the aggregated language model.

2. The method of claim 1, wherein the first linguistic information includes text entered by one or more users of the first group.

3. The method of claim 1, further comprising:
providing the first and second language models to a mobile device associated with the particular user.

4. The method of claim 1, further comprising:
associating the aggregated language model with the particular user.

5. The method of claim 1, further comprising:
distributing the aggregated language model to a client device associated with the particular user.

6. The method of claim 1, wherein the multiple language models comprise a general language model representative of a particular spoken language, a personal language model representative of speech of a certain user, a social graph language model representative of speech of users associated with a social graph, a context language model representative of speech within a particular context, and a topic language model representative of speech associated with a particular topic.

7. The method of claim 1, further comprising:
determining that another user of the social network is part of at least one of the first group and the second group of the multiple groups of user of the social network; and
in response to determining that the other user of the social network is part of at least one of the first group and the second group of the multiple groups of user of the social network, associating the aggregated language model with the other user of the social network to generate a transcription of an utterance of the other user using the aggregated language model.

8. A system comprising:
one or more computers and one or more storage devices storing instructions that are operable, when executed by the one or more computers, to cause the one or more computers to perform operations comprising:
receiving voice data associated with an utterance of a particular user of a social network, the social network comprising multiple groups of users, the users segmented into the groups based on data indicating respective commonalities for the users in each group;
identifying multiple language models associated with the social network, each of the multiple language models respectively associated with one or more of the groups of users of the social network,
wherein the multiple language models comprise a first language model that was generated based on first linguistic information associated with a first group of the multiple groups of users of the social network, and a second language model that was generated based on second linguistic information associated with a second group of the multiple groups of users of the social network, wherein each of the first group and the second group is part of a social graph for the particular user, the social graph for the particular user determined by a set predetermined number of degrees of separation from the particular user to other users in the social network, and wherein the particular user is associated with a particular cluster based, at least in part, on a probability of the user belonging to the cluster;
selecting at least the first language model from among the multiple language models associated with the social network based on a first criteria of a set of selection criteria and the second language model from among the multiple language models associated with the social network based on a second criteria of the set of selection criteria, the second criteria being different from the first criteria, wherein the set of selection criteria comprises a social relationship between the particular user of the social network and another user of the social network with whom the particular user is communicating, a topic of communication associated with the utterance of the particular user of the social network, a context within which the voice data associated with the utterance of the particular user of the social network is received, and a demographic characteristic of the particular user of the social network;
aggregating at least the first language model selected from among the multiple language models associated with the social network based on the first criteria of the set of selection criteria and the second language model selected from among the multiple language models associated with the social network based on a second criteria of the set of selection criteria to form an aggregated language model; and
generating a transcription of the utterance of the particular user using the aggregated language model.

9. The system of claim 8, wherein the first linguistic information includes text entered by one or more users of the first group.

10. The system of claim 8, the operations further comprising:
providing the first and second language models to a mobile device associated with the particular user.

11. The system of claim 8, the operations further comprising:
associating the aggregated language model with the particular user.

12. The system of claim 8, the operations further comprising:
distributing the aggregated language model to a client device associated with the particular user.

13. The system of claim 8, wherein the multiple language models comprise a general language model representative of a particular spoken language, a personal language model representative of speech of a certain user, a social graph language model representative of speech of users associated with a social graph, a context language model representative of speech within a particular context, and a topic language model representative of speech associated with a particular topic.

14. The system of claim 8, the operations further comprising:
determining that another user of the social network is part of at least one of the first group and the second group of the multiple groups of user of the social network; and
in response to determining that the other user of the social network is part of at least one of the first group and the second group of the multiple groups of user of the social network, associating the aggregated language model with the other user of the social network to generate a transcription of an utterance of the other user using the aggregated language model.

15. A non-transitory computer-readable storage medium encoded with instructions that, when executed by one or more computers, cause the one or more computers to perform operations comprising:
receiving voice data associated with an utterance of a particular user of a social network, the social network comprising multiple groups of users, the users segmented into the groups based on data indicating respective commonalities for the users in each group;

identifying multiple language models associated with the social network, each of the multiple language models respectively associated with one or more of the groups of users of the social network, wherein the multiple language models comprise a first language model that was generated based on first linguistic information associated with a first group of the multiple groups of users of the social network, and a second language model that was generated based on second linguistic information associated with a second group of the multiple groups of users of the social network, wherein each of the first group and the second group is part of a social graph for the particular user, the social graph for the particular user determined by a set predetermined number of degrees of separation from the particular user to other users in the social network, and wherein the particular user is associated with a particular cluster based, at least in part, on a probability of the user belonging to the cluster;

selecting at least the first language model from among the multiple language models associated with the social network based on a first criteria of a set of selection criteria and the second language model from among the multiple language models associated with the social network based on a second criteria of the set of selection criteria, the second criteria being different from the first criteria, wherein the set of selection criteria comprises a social relationship between the particular user of the social network and another user of the social network with whom the particular user is communicating, a topic of communication associated with the utterance of the particular user of the social network, a context within which the voice data associated with the utterance of the particular user of the social network is received, and a demographic characteristic of the particular user of the social network;

aggregating at least the first language model selected from among the multiple language models associated with the social network based on the first criteria of the set of selection criteria and the second language model selected from among the multiple language models associated with the social network based on a second criteria of the set of selection criteria to form an aggregated language model; and generating a transcription of the utterance of the particular user using the aggregated language model.

16. The computer-readable storage medium of claim 15, wherein the first linguistic information includes text entered by one or more users of the first group.

17. The computer-readable storage medium of claim 15, the operations further comprising:
providing the first and second language models to a mobile device associated with the particular user.

18. The computer-readable storage medium of claim 15, the operations further comprising:
associating the aggregated language model with the particular user.

19. The computer-readable storage medium of claim 15, the operations further comprising:
distributing the aggregated language model to a client device associated with the particular user.

20. The computer-readable storage medium of claim 15, wherein the multiple language models comprise a general language model representative of a particular spoken language, a personal language model representative of speech of a certain user, a social graph language model representative of speech of users associated with a social graph, a context language model representative of speech within a particular context, and a topic language model representative of speech associated with a particular topic.

21. The computer-readable storage medium of claim 15, the operations further comprising:
determining that another user of the social network is part of at least one of the first group and the second group of the multiple groups of user of the social network; and
in response to determining that the other user of the social network is part of at least one of the first group and the second group of the multiple groups of user of the social network, associating the aggregated language model with the other user of the social network to generate a transcription of an utterance of the other user using the aggregated language model.

* * * * *